United States Patent [19]

Wolfs et al.

[11] 4,174,961
[45] Nov. 20, 1979

[54] METHOD FOR WORKING-UP WASTE SLAG FROM THE OXYGEN STEEL PRODUCTION

[75] Inventors: Andreas G. J. Wolfs, Lanaken, Belgium; Lambertus H. Goessens, Maastricht, Netherlands

[73] Assignees: Eerste Nederlandse Cement Industrie (ENCI) N.V., Maastricht, Netherlands; C.B.R. Cementbedrijven N.V., Brussels, Belgium; a part interest to each

[21] Appl. No.: 847,509

[22] Filed: Nov. 1, 1977

[51] Int. Cl.[2] ............................................. C21B 3/04
[52] U.S. Cl. ................................... 75/30; 75/24; 75/80; 75/129; 106/117
[58] Field of Search ................ 75/24, 30, 80, 129; 106/117

[56] References Cited

U.S. PATENT DOCUMENTS

| 3,015,553 | 1/1962 | Johnson | 75/30 |
| 3,114,648 | 12/1963 | Rea | 106/117 |
| 4,009,024 | 2/1977 | Miller | 75/24 |

FOREIGN PATENT DOCUMENTS

| 1146160 | 3/1969 | United Kingdom | 106/117 |
| 1170084 | 11/1969 | United Kingdom | 106/117 |

*Primary Examiner*—M. J. Andrews
*Attorney, Agent, or Firm*—Ladas, Parry, Von Gehr, Goldsmith & Deschamps

[57] ABSTRACT

A new method is disclosed for recovering elemental iron and manganese present in oxide form in waste slag obtained from oxygen steel production. The metal oxides are reduced in the presence of carbon or carbon combined with a coal mine waste material and an $Al_2O_3$-containing additive present in the form of a silicate.

7 Claims, 3 Drawing Figures

Diagram representing the percentages w/w of CaO, Al₂O₃ and SiO₂

METHOD FOR WORKING-UP WASTE SLAG FROM THE OXYGEN STEEL PRODUCTION

The invention relates to a method for working-up waste slag from the oxygen steel production (hereafter to be called L.D.-slag), said method comprising reducing metal oxides being present in the slag to metal by means of a reducing agent and with the addition of an $Al_2O_3$-containing additive and separating them from the slag.

In certain areas often large amounts of slag are found, originating i.a. from the method of the oxygen steel production, the so-called "L.D.-slag". This slag, contrary to blast furnace slag, after cooling (quenching) is not hydraulic and so not very valuable. The possibility of recycling the slag in a blast furnace to extract the iron is limited as a result of accumulation of undesired elements. The waste piles of this slag can so be considered as being detrimental to the environment.

The main components of the L.D.-slag are usually within the following limits:

| | | | |
|---|---|---|---|
| $SiO_2$ | 7 | – | 18% by weight |
| $Al_2O_3$ | 0.3 | – | 2% by weight |
| CaO | 35 | – | 55% by weight |
| MgO | 2.6 | – | 6% by weight |
| $Fe + FeO_x$ | 15 | – | 40% by weight |
| $MnO_x$ | 2 | – | 6.5% by weight |
| $P_2O_5$ | 1 | – | 2.5% by weight |

The iron content of the slag is such that extraction of iron from the slag appears useful. Extraction of the iron from the slag by a simple reduction treatment is difficult and economically little renumerative. In a reducing atmosphere at a temperature of about 1200° C., it is true, metallic iron is formed, but this iron remains finely divided in the pores of the remaining slag because the temperature at which this slag becomes liquid is considerably increased by reducing the iron compounds. The iron can hardly be separated from the remaining slag.

French patent application No. 73 05145 shows a method to extract metal from a L.D.-slag, with which method also a slag that can still be used for certain applications is obtained. One starts from a liquid L.D.-slag, to which bauxite is added. Starting from a liquid L.D.-slag the reduction still takes place at about 1600° C. by means of a solid reducing agent such as carbon or aluminium. In areas where bauxite is a relatively expensive raw material, said method is not very attractive. One of the examples, however, indicates that besides $Al_2O_3$ also $SiO_2$ can be added to the flux, a slag being obtained that after cooling and grinding has hydraulic properties. Energetically this method is not attractive, especially if one would start from an already cooled slag (dumped material).

British Pat. specification No. 922 586 shows the extraction of iron from a slag, but this method is no more than a modified blast furnace process by the use of coke, iron ore and lime and cannot be used for the L.D.-slag. The remaining slag still contains rather much iron.

The purpose of the invention is to provide a method for working-up L.D.-slag, said method allowing (a) extraction of metal from the slag by reduction at relatively low temperature and not necessarily in the liquid phase, whereby advantageously an already cooled L.D.-slag (dumped material) can be used as starting material;

(b) the use as a flux additive of a material having a lower $Al_2O_3$-content than bauxite, preferably a waste material;

(c) the separation of slag and metal at a relatively low temperature and preferably in a technologically simple way; while (d) the remaining slag is an industrially useful product which preferably can be simply converted into a normal portland- or blast furnace cement.

According to the invention this purpose is reached if the L.D.-slag is mixed beforehand with an additive (additives) at least containing the oxides of aluminium and silicon, said additive(s) being used in a ratio of 45–2½ parts of additive to 55–9½ parts of L.D.-slag and with carbon as a reducing agent and the reduction mainly takes place in the solid phase, whereafter between about 1250° C. and 1500° C. the iron is separated from the newly formed slag and is subsequently removed. Preferably a temperature between about 1350° C. and 1450° C. is used.

After adding lime the newly formed slag can be converted into a portland cement clinker. By lime, materials are meant being high in CaO- or $CaCO_3$-content. The complete L.D.-slag can be converted into valuable products according to the above method.

Preferably as an additive at least containing the oxides of aluminium and silicon aluminium silicates are used, but in a further embodiment of the method still to be discussed also other additives can be used.

An important aspect of the invention is that it is distinguished that simultaneously also other materials being detrimental to the environment can be used as additives and thus can be converted into a suitable product. This applies especially to the waste products of coal mines often to be found in the neighbourhood of steel industry, such as mine stones or stone sludge. Said waste products also often contain 15 up to 24% by weight of carbon which can simultaneously be used as a cheap reducing agent so that no or only a small amount of other reducing agents being rich in energy is necessary. This waste material can e.g. (not limitatively) have the following composition: inorganic components, for the major part aluminium silicates (determined as "ash", and hereafter to be called "schist ash") 68% by weight; loss on ignition, for the greater part carbon 32% by weight the analysis of the schist ash comprises:

$SiO_2$—56% by weight $Al_2O_3$—25% by weight

CaO—3% by weight $Fe_2O_3$—8% by weight.

Besides these waste products from coal mines also fly ash being detrimental to the environment can be used. The chemical composition hereof corresponds with the one of schist ash. Also fly ash, schist, stone sludge, clays or clay-containing waste materials and the like can be used separately or mixed with each other.

In French patent application No. 73 05145 it is not distinguished that it is possible to use also aluminium silicates instead of bauxite, such as the mentioned waste materials of coal mines.

The ratio of L.D.-slag to added aluminium silicate can be varied within broad limites, dependent on the nature of the added aluminium silicate and the nature of the remaining new slag that is desired. The amounts can be between 55–97½ parts of L.D.-slag and 45–2½ parts of the aluminium silicate-containing materials.

If one starts from waste stone of coal mines in a ratio being somewhat dependent on the composition of said stone, of 55-80 parts of L.D.-slag and 45-20 parts of schist (calculated on ash), then after separation of metal at 1350° up to 1450° C. a liquid slag is obtained, the composition of which is approximately the same as the one of a normal blast furnace slag. This slag after quenching can be processed into a hydraulic binding agent or as such be converted into portland cement clinker in a known way by applying lime.

Separating iron in the liquid phase has a number of disadvantages. Especially a rotary kiln cannot simply be used for said purpose.

According to the present invention it is possible to avoid these disadvantages if according to a preferred method to the L.D.-slag so much additive is added that in the slag calcium silicate is present having the composition $2\,CaO.SiO_2$. This material has the property to disintegrate into a fine powder under the right cooling conditions and when present in the slag in a sufficient amount in the slag also can disintegrate said slag into a fine powder.

So more specifically to the L.D.-slag so much additive is added that the resulting slag in a triangular diagram (FIG. 3) representing the percentages of CaO, $Al_2O_3$ and $SiO_2$ is within an area of which, for a temperature of 1350° C., three vertices can be indicated having the following compositions:

|    | % CaO | %$Al_2O_3$ | % $SiO_2$ |
|----|-------|------------|-----------|
| 1. | 55    | 3          | 42        |
| 2. | 60    | 28         | 12        |
| 3. | 70    | 4          | 26        |

Every composition of the slag within the area comprised by these three vertices appears to lead to the spontaneous disintegration of the formed slag into a fine powder during cooling to about 200° C.

It was also found that the metallic iron is present in the formed slag in finely divided state. After cooling and disintegration of the slag the iron particles then being present in the powder can easily in a known way be separated from the powder, e.g. by magnetic forces, by air separator and the like.

Surprisingly it also appeared that the size of the iron particles can be influenced. If additives are added such that the composition of the slag is close to the line connecting the points 1 to 2 the iron particles are considerably larger than the slag particles and with a composition close to the point 3, however, their size does not differ much from the size of the slag particles. Therefore, for a good separation of iron and powdery slag the composition will as much as possible be adjusted in the first mentioned area.

Said composition can be obtained by adding as an additive 20-2½ parts of aluminium silicate, e.g. schist with respect to 80-97½ parts of L.D.-slag. In order to reach the same result also many other additives can be added. These other additives comprise aluminium oxide and silica containing materials: blast furnace slag, Rotschlamm and the like.

The formed powder after separating the iron can be converted into portland cement clinker in a known way by means of lime. A great advantage herewith is that the slag is already available as a fine powder and that in the slag lime in decarbonated form is present.

A practical embodiment of the above mentioned preferred method consists in that L.D.-slag, additive and carbon are granulated, the granules are dried in a rotary kiln, are reduced and sintered, the granules are subsequently cooled to about 200° C. while recovering the heat, whereafter the iron is separated from the disintegrated slat. This method with granules has the great advantage that in a simple way a rotary kiln can be used. The iron is initially included in the granules and hardly reoxidises.

Figure 1:
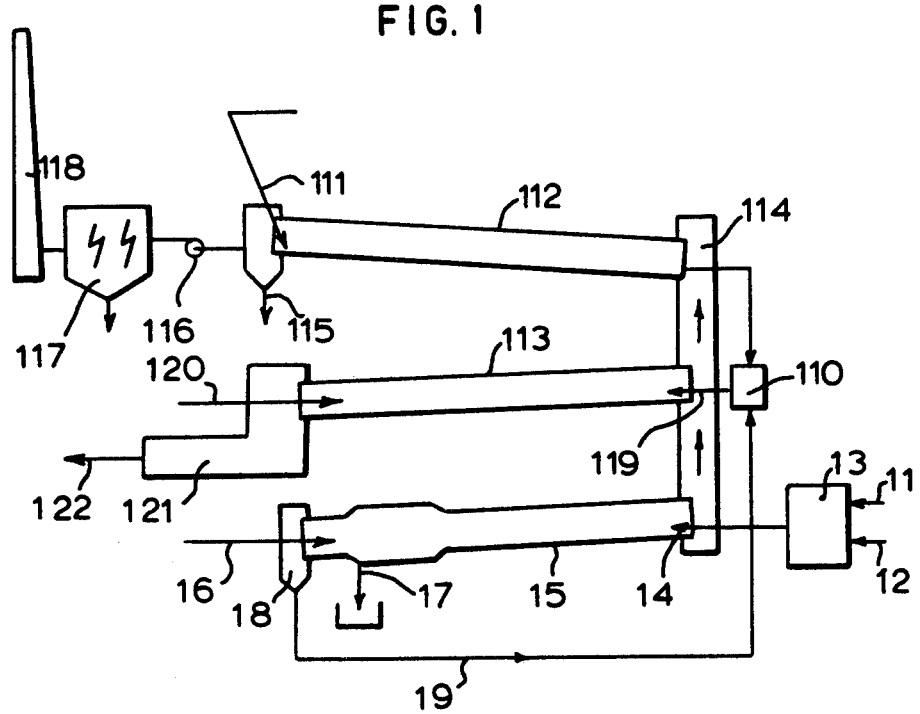
FIG. 1 is a flow-sheet of a possible treatment of L.D.-slag with additives for preparing iron and portland cement clinker by means of rotary kilns, in accordance with example 1 below.

The invention is illustrated by means of examples.

EXAMPLE 1

In a laboratory mill (disk vibrating mill) 80 grammes of L.D.-slag, chemical analysis (all in percentages by weight):
CaO—36.2%, $SiO_2$—13.5%, $Al_2O_3$—1.9%, MgO—4.4%, $Fe_2O_3$—34.1%, Mn—4.4% and $P_2O_5$—1.5%, were ground during 2 minutes together with 40 grammes of schist waste from a coal washery. The chemical analysis of the schist was:
CaO—1.2%, $SiO_2$—36.9%, $Al_2O_3$—17.1%, MgO—1.5%, $Fe_2O_3$—5.0%, $P_2O_5$—0.2%, loss on ignition—32%.

The thus prepared raw materials were introduced into a crucible of sintered aluminium oxide and electrically heated in a resistance furnace up to a furnace temperature of 1400° C. A reducing furnace atmosphere was maintained by placing the above mentioned crucible in a larger one, the bottom of which being covered with carbon. After a period of 30 minutes at 1400° C. the crucible was removed from the furnace and cooled in the air to room temperature. Hereafter the content of the crucible was examined.

On the bottom of the crucible iron had been collected. The weight hereof was 21.7 grammes and the chemical analysis: Fe—94%, P—1.4%, Mn—0.9%, C—2.4%, Si—0.0%.

Over the iron there were 76 grammes of slag, the chemical analysis of which was: CaO—38.2%, $SiO_2$—33.2%, $Al_2O_3$—12.4%, MgO—5.4%, $Fe_2O_3$—1.2%, MnO—3.9% and $P_2O_5$—0.2%.

In a laboratory mill 50 grammes of the obtained slag were ground during 2 minutes together with 105 grammes of limestone with chemical analysis: CaO—50.6%, $SiO_2$—6.2%, $Al_2O_3$—0.9%, $Fe_2O_3$—0.4%, MgO—0.8% and an ignition loss of 40.9%. The obtained powder was pressed into a tablet, whereafter the tablet was introduced into a platinum crucible and electrically heated in an resistance furnace to a furnace temperature of 1450° C. After heating for 30 minutes at 1450° C. in an oxidizing atmosphere the crucible was removed from the furnace and cooled in the air.

The sintered tablet was microscopically examined; the material appeared not to deviate mineralogically from normal portland cement clinker.

EXAMPLE 2

A L.D.-slag with chemical analysis (all percentages by weight):

CaO—39.2%, SiO$_2$—12.9%, Al$_2$O$_3$—1.9%, MgO—5.2%, Fe$_2$O$_3$—33.8%, MnO—4.9% and P$_2$O$_5$—1.7% and schist with chemical analysis:
CaO—0.4%, SiO$_2$—39.8%, Al$_2$O$_3$—15.2%, MgO—1.4%, Fe$_2$O$_3$—4.8%, ignition loss—34.2% and pure carbon, were used for preparing mixtures A and B. Mixture A consisted of 100 grammes of L.D.-slag, 15.1 grammes of schist and 4.5 grammes of carbon.
Mixture B consisted of 100 grammes of L.D.-slag, 20.4 grammes of schist and 3.3 grammes of carbon.

The mixtures A and B were separately ground in a laboratory mill (disk vibrating mill) during 2 minutes and thereafter granulated with water to granules of about 2 cm. The obtained granules of the mixtures A and B were separately introduced into a crucible of sintered aluminium oxide, lined at the inner side with a thin layer of silicon carbide and electrically heated in a resistance furnace up to a temperature of 1400° C. A reducing atmosphere was maintained in the crucible by covering said crucible with a refractory plate.

After a period of 60 minutes at 1400° C. the heating was switched off and the furnace allowed to slowly cool down to 800° C., whereafter the crucible was removed from the furnace and further cooled in the air.

The granules of sample A spontaneously disintegrated at a temperature of 230° C. while the granules of sample B disintegrated at 180° C. In both cases the iron was present in the disintegrated material as agglomerated granules.

The measured particle size distribution of the iron and the remaining disintegrated slag are shown in weight percentages in the following table.

TABLE

| Sample | A | | B | |
|---|---|---|---|---|
| Fractions | Slag | Iron | Slag | Iron |
| 0.20 μm | 50.5% | 15.0% | 61.1% | 5.9% |
| 20–40 μm | 35.4% | 30.6% | 32.1% | 15.7% |
| 40–63 μm | 1.7% | 28.2% | 0 % | 24.6% |
| 63–150 μm | 12.0% | 18.4% | 4.1% | 23.7% |
| > 150 μm | 0.4% | 7.8% | 2.7% | 30.1% |
| Totally | 100% | 100% | 100% | 100% |

From the table it appears that the granule distribution of the iron in sample B is coarser than in sample A. This is in agreement with the fact that the composition of the slag of sample B is closer to the line connecting the points 1 to 2 in the said triangular diagram.

The invention is further illustrated by means of a drawing. FIG. 1 is a flow-sheet of a possible treatment of a L.D.-slag with additives for preparing iron and portland cement clinker by means of rotary kilns, in accordance with example 1. It is explicitly stated that the application of the present invention on a technical scale is not limited to the embodiment according to the example. Other technical embodiments are possible, e.g. with other furnaces than rotary kilns.

In the flow-sheet of FIG. 1 at 11 L.D.-slag and at 12 schist (e.g. the waste stone of a coal mine) are supplied to a crusher 13 crushing the raw materials. At 14 the broken product is supplied to a rotary kiln 15 wherein the iron compounds of the L.D.-slag are reduced by the carbon being present with the schist, optionally supplemented with an other reducing agent. At 16 heating gas is supplied to bring the mass in the furnace at the desired temperature. In the furnace the mass finally melts at about 1400° C. and at 17 from the melt separated pig iron can be drained off. By means of a drain 18 finally the remaining new slag is extracted. Said slag is brought to a mixer 110 via route 19 in liquid form or after cooling in solid form.

At 111 wet or dry finely divided limestone or chalk is supplied to a heat exchanger 112 (e.g. a drum) and is preheated. For the benefit of this preheating flue gases of the rotary kiln 15 and the sintering furnace 113 still to be discussed can be used, which gases are supplied via a flue gas channel 114. The heat exchanger 112 is of course provided with a dust discharge 115, a flue gas fan 116 and an electrofilter 117 for catching the finest dust while the flue gases are released in the atmosphere via chimney 118.

The preheated 37 meal" from the heat exchanger 112 is also introduced into the mixer 110 (optionally with dust separated in 115 and 117) and after mixing with the slag which was extracted at 18 is supplied to the sintering furnace 113. The supplied hot mixture 119 of slag and limestone meal is heated in the sintering furnace 113 up to about 1400° C., for which purpose at 120 heating gas is introduced. The sintered product is cooled in a cooler 121 and at 122 is discharged as portland cement clinker for further processing to cement.

In the following table finally a raw material balance is given for producing pig iron and portland cement clinker according to the method of the invention, which method can be carried out with a device as schematically described above. One starts from 1000 kg of L.D.-slag as well as schist from a coal mine. The composition of the raw materials and products are expressed in kg of the oxide of the elements, determined from the chemical analysis.

| | Production of pig iron | | | | Production of clinker | |
|---|---|---|---|---|---|---|
| | Started from | | Obtained | | Added | Obtained |
| | L.D.-slag | schist | pig iron | slag | limestone | clinker |
| SiO$_2$ | 135 | 185 | 0 (Si) | 320 | 126 | 446 |
| Al$_2$O$_3$ | 19 | 86 | — | 105 | 18 | 123 |
| MnO | 44 | — | 3 (Mn) | 40 | — | 40 |
| CaO | 362 | 6 | — | 368 | 1027 | 1395 |
| MgO | 44 | 7 | — | 51 | 17 | 68 |
| K$_2$O | 0 | 19 | — | 19 | 1 | 20 |
| Na$_2$O | 9 | 2 | — | 11 | — | 11 |
| SO$_3$ | 2 | 6 | — | 8 | — | 8 |
| P$_2$O$_5$ | 14 | 1 | 5 (P) | 3 | — | 3 |
| Fe$_2$O$_3$ | 341 | 25 | 248 (Fe) | 11 | 8 | 19 |
| Rest | 30 | 3 | 7 | 33 | 3 | 36 |
| Ignition loss | — | 160 | — | — | 830 | — |
| Totally | 1000 | 500 | 263 | 969 | 2030 | 2169 |

Starting from 1000 kg of L.D.-slag with the composition of the raw materials mentioned in the example one obtains:
263 kg of pig iron and
2169 kg of portland cement clinker.
Herefor the following had to be added:
500 kg of schist and
2030 kg of crude limestone (Maestricht chalk).

The schist added as "mine stone" has an ignition loss of 32% by weight, caused by the presence of for the major part coal (reducing agent), and, further by carbonates and bonded water.

Figure 2:
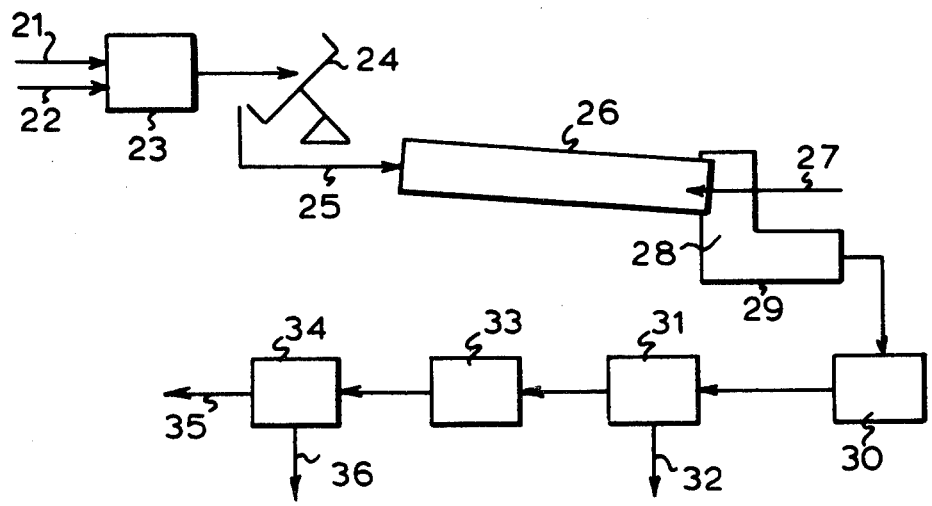
FIG. 2 is a schematic of a variant of the preferred method.
Figure 3:
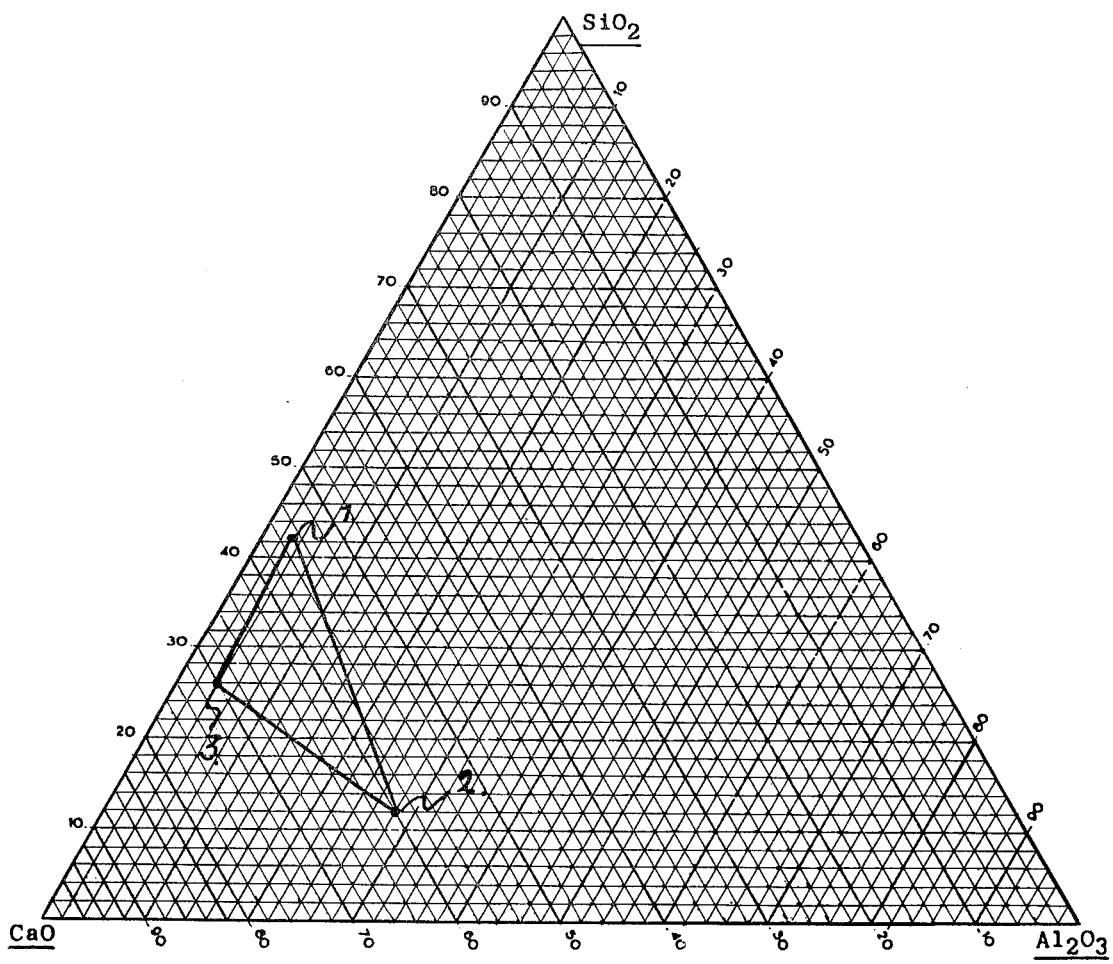
FIG. 3 is a triangular diagram representing the percentages of CaO, $Al_2O_3$ and $SiO_2$.

In FIG. 2 a variant according to the preferred method is schematically shown. At 21 L.D.-slag and at 22 flux additive (e.g. schist from a coal mine or another additive) and optionally carbon are supplied to a grinding and mixing device 23 in dosed amounts. The ground and mixed product is first granulated in the presence of water on a granulation disk (or another granulation device). At 25 the granules are supplied to a rotary kiln 26. In the rotary kiln 26 the granules are heated to the desired temperature for which purpose heating gas is supplied at 27. The iron compounds of the L.D.-slag are reduced to iron in the presence of carbon, which iron remains uniformly divided in the granules. At 28 the hot granules leave the furnace 26 and are cooled with air on a grid 29. This air is used as hot combustion air, what provides a favorable energy yield. In the storage 30 the granules are cooled so far that they disintegrate into powder. The disintegrated powder is separated in one or more air separators 31 into fine product 32, which product is substantially "free of iron", and into coarse material. The coarse material is processed in a mill 33 for reducing less good disintegrated slag. In the separator 34 the iron product 35 and remaining slag 36 are recovered. The slags 32 and 36 from which the iron is extracted can in a known way by means of chalk be calcined to portland cement clinker.

Summarizing the essence of the invention it has to be appreciated that the L.D.-slag, a material being detrimental to the environment with an other material, respectively materials being detrimental to the environment at relatively low temperature can be converted into pig iron and a material that can be used as a hydraulic product, or a material that can be processed according to usual methods thus forming a hydraulic product. However, the invention is not strictly limited to the use of an additive being a waste material. Another essence of the invention is that it is possible according to a preferred embodiment to use a rotary kiln without complications and to separate the formed iron in a very simple way while the slag becomes available in powder form for further processing into a portland cement clinker. Finally the method is energetically favorable.

What is claimed is:

1. A method of treating waste slag from oxygen steel production (L.D.-slag), involving reduction of iron and maganese oxide being present in the slag to their metals after addition of an Al$_2$O$_3$-containing additive and heating the total composition, the iron and the manganese being subsequently separated therefrom, which comprises the steps of:
   (1) mixing said L.D.-slag and said Al$_2$O$_3$-containing additive being present in the form of a silicate selected from the group consisting of at least one of the waste products of coal mine products including stone-sludge, fly ash, schists, clays, clay-containing waste materials and blast furance slag;
   (2) mixing said L.D.-slag in a ratio of 55–97½ parts to 45–2½ parts of said Al$_2$O$_3$-containing additive:
   (3) mixing said L.D.-slag with carbon, or with carbon combined with carbon-containing coal mine waste materials;
   (4) heating the composition so obtained to a temperature of between about 1250° C. to 1500° C., and allowing reduction of said iron and manganese oxides during heating; and
   (5) recovering iron and maganese in molten state from the slag.

2. A method according to claim 1, step (2) wherein 55 to 80 parts of L.D.-slag are mixed with 45 ot 20 parts of schist (calculated as ash).

3. A method of treating the waste slag from the oxygen steel production (L.D.-slag), involving reduction of iron and maganese oxides being present in the slag, to their metals after addition of an Al$_2$O$_3$-containing additive and heating the total composition, the iron and the manganese being subsequently separated therefrom, which comprises the steps of:
   (1) mixing said L.D.-slag and said Al$_2$O$_3$-containing additive being present in the form of a silicate selected from the group consisting of at least one of the waste products of coal mines including stone-sludge, fly ash, schists, clays, and clay-containing waste materials and blast furnace slag;
   (2) mixing said L.D.-slag and said Al$_2$O$_3$-containing additive in such amounts to obtain a total composition expressed in terms of the oxides CaO, Al$_2$O$_3$ and SiO$_2$ in a ratio falling within the area defined by the following three weight percentage points on a triangle phase diagram, plotted for a temperature of 1350° C.:

|   | CaO | Al$_2$O$_3$ | SiO$_2$ |
|---|-----|-------|--------|
| 1 | 55  | 3     | 42     |
| 2 | 60  | 28    | 12     |
| 3 | 70  | 4     | 26     |

(3) mixing said L.D.-slag and said Al$_2$O$_3$-containing additive with carbon, or with carbon in combination with said coal mine waste materials;
   (4) granulating said composition;
   (5) heating said granulated composition up to about 1400° C. and allowing reduction of said iron and manganese oxides during heating;
   (6) subsequently cooling said heated granules to between about 180° C. and 230° C.; and
   (7) recovering finely divided iron and manganese particles from said cooled and spontaneously disintergrated granules.

4. A method according to claim 3, wherein the ratio of the oxides CaO, Al$_2$O$_3$ and SiO$_2$ of said composition is adjusted close to the line connecting said points 1 and 2 in said triangle phase diagram.

5. A method according to claim 3 wherein the heated granules are cooled to about 200° C.

6. A method according to claim 1 wherein after recovering the iron and manganese during step (5) the remaining slag is converted to a portland cement clinker, after adding materials containing a high CaO or CaCO$_3$ content.

7. A method according to claim 3, wherein after recovering the iron and manganese in step (7) the remaining slag is converted to a portland cement clinker, after adding materials containing a high CaO or CaCO$_3$ content.

* * * * *